(12) United States Patent
Anzai et al.

(10) Patent No.: US 10,308,185 B2
(45) Date of Patent: Jun. 4, 2019

(54) VEHICLE MIRROR WITH IMAGE DISPLAY FUNCTION

(71) Applicant: FUJIFILM Corporation, Tokyo (JP)

(72) Inventors: Akihiro Anzai, Minami-ashigara (JP); Kazuhiro Oki, Minami-ashigara (JP); Mitsuyoshi Ichihashi, Minami-ashigara (JP); Takao Taguchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 15/609,345

(22) Filed: May 31, 2017

(65) Prior Publication Data

US 2017/0259744 A1    Sep. 14, 2017

Related U.S. Application Data

(63) Continuation of application No. PCT/JP2015/083566, filed on Nov. 30, 2015.

(30) Foreign Application Priority Data

Dec. 1, 2014   (JP) .................................. 2014-243445

(51) Int. Cl.
*G02B 5/30* (2006.01)
*B60R 1/12* (2006.01)
(Continued)

(52) U.S. Cl.
CPC .................. *B60R 1/12* (2013.01); *B60R 1/04* (2013.01); *B60R 1/083* (2013.01);
(Continued)

(58) Field of Classification Search
CPC ...... G02B 5/08; G02B 5/0816; G02B 5/0825; G02B 5/0833; G02B 5/0841; G02B 5/30;
(Continued)

(56) References Cited

U.S. PATENT DOCUMENTS 3,610,729 A * 10/1971 Rogers ................... G02B 5/305
359/485.03
5,966,242 A   10/1999 Yamanaka
(Continued)

FOREIGN PATENT DOCUMENTS

JP    60-169620 U   11/1985
JP    4-4500 A     1/1992
(Continued)

OTHER PUBLICATIONS

Notification of Transmittal of Translation of the International Preliminary Report on Patentability; International Preliminary Report on Patentability and English Translation of Written Opinion of the International Searching Authority, dated Jun. 15, 2017, issued in PCT/JP2015/083566 (Forms PCT/IB/338; PCT/IB/373 and PCT/ISA/237).

(Continued)

*Primary Examiner* — Arnel C Lavarias

(74) *Attorney, Agent, or Firm* — Birch, Stewart, Kolasch & Birch, LLP

(57) ABSTRACT

A vehicle mirror with an image display function including, in this order: an image display device; a circular polarization reflection layer; and a front surface plate made of glass or plastic, in which the circular polarization reflection layer includes a linear polarization reflection plate and a ¼ wavelength plate from the image display device side. The vehicle mirror with an image display function of the invention is capable of displaying a bright image.

18 Claims, 1 Drawing Sheet

1: image display device
2: circular polarization reflection layer
3: front surface plate
4: linear polarization reflection plate
5: 1/4 wavelength plate
6: adhesive layer
7: adhesive layer

(51) Int. Cl.
*B60R 1/04* (2006.01)
*B60R 1/08* (2006.01)
*G02F 1/1333* (2006.01)
*G02F 1/1335* (2006.01)
*G02F 1/13363* (2006.01)
*H04N 5/65* (2006.01)
*G02B 27/28* (2006.01)
*H04N 5/64* (2006.01)

(52) U.S. Cl.
CPC .... *G02F 1/13363* (2013.01); *G02F 1/133308* (2013.01); *G02F 1/133536* (2013.01); *H04N 5/65* (2013.01); *B60R 2001/1253* (2013.01); *G02B 27/28* (2013.01); *G02F 2001/133541* (2013.01); *G02F 2001/133562* (2013.01); *G02F 2001/133638* (2013.01); *G02F 2203/01* (2013.01); *G02F 2413/01* (2013.01); *G02F 2413/05* (2013.01); *H04N 5/64* (2013.01)

(58) Field of Classification Search
CPC .... G02B 5/3025; G02B 5/3041; G02B 5/305; G02B 5/3083; G02B 27/28; G02B 27/286; B60R 1/04; B60R 1/02; B60R 1/08; B60R 1/083; B60R 1/088; B60R 1/12; B60R 2001/1215; B60R 2001/1238; B60R 2001/1253; B60R 2001/1246
USPC ............ 359/483.01, 488.01, 485.03, 485.01, 359/489.01, 489.07, 838, 839, 844, 871, 359/883; 349/1, 5, 11, 13, 58, 96, 98, 349/113, 115, 122, 162
See application file for complete search history.

(56) References Cited

U.S. PATENT DOCUMENTS

| | | | |
|---|---|---|---|
| 7,656,586 B2 * | 2/2010 | Rosario | B60R 1/12 |
| | | | 359/265 |
| 2004/0100598 A1 | 5/2004 | Adachi et al. | |
| 2007/0041096 A1 | 2/2007 | Nieuwkerk et al. | |
| 2014/0168544 A1 | 6/2014 | Niimi | |

FOREIGN PATENT DOCUMENTS

| | | |
|---|---|---|
| JP | 10-10465 A | 1/1998 |
| JP | 2001-318374 A | 11/2001 |
| JP | 2007-511792 A | 5/2007 |
| JP | 2010-91655 A | 4/2010 |
| JP | 2014-201146 A | 10/2014 |
| WO | WO 2013/011811 A1 | 1/2013 |

OTHER PUBLICATIONS

Japanese Notification of Reasons for Refusal for corresponding Japanese Application No. 2016-562444, dated Feb. 27, 2018, with Machine translation.
International Search Report (PCT/ISA/210) issued in PCT/JP2015/083566, dated Feb. 16, 2016.
Written Opinion of the International Searching Authority (PCT/ISA/237) issued in PCT/JP2015/083566, dated Feb. 16, 2016.
Japanese Notification of Reasons for Refusal, dated Sep. 4, 2018, for Japanese Application No. 2016-562444, with an English translation.

* cited by examiner

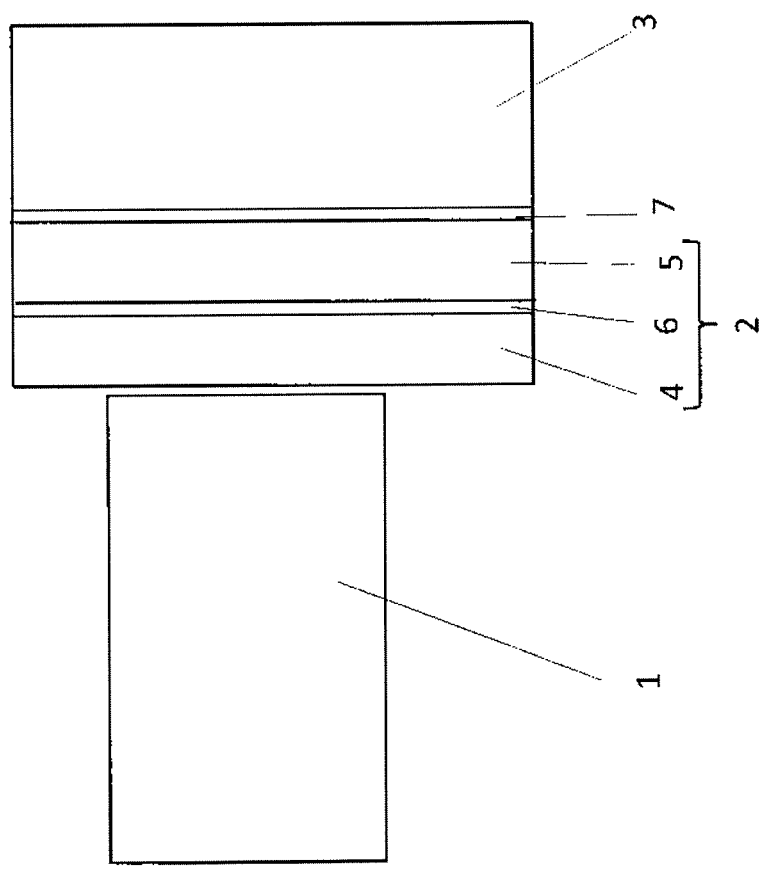

VEHICLE MIRROR WITH IMAGE DISPLAY FUNCTION

CROSS-REFERENCE TO RELATED APPLICATIONS

This application is a continuation of PCT International Application No. PCT/JP2015/083566 filed on Nov. 30, 2015, which claims priority under 35 U.S.C § 119 (a) to Japanese Patent Application No. 2014-243445 filed on Dec. 1, 2014, the entire content of which is incorporated herein by reference.

BACKGROUND OF THE INVENTION

1. Field of the Invention

The present invention relates to a vehicle mirror with an image display function.

2. Description of the Related Art

For example, JP2014-201146A describes, as a vehicle mirror, a vehicle mirror with an image display function capable of displaying an image such as an image captured by a vehicle-mounted camera.

SUMMARY OF THE INVENTION

As described in JP2014-201146A, the vehicle mirror with an image display function is provided with a liquid crystal display device in a housing of the vehicle mirror to display an image through a half mirror provided on a front surface of the vehicle mirror, thereby realizing the image display on the mirror. However, in general, the visible light transmittance of a half mirror is approximately 30% to 70%, and a configuration having a half mirror has a potential problem in that an image appears darker than that in a configuration with no half mirror. An object of the invention is to solve the problem. That is, an object of the invention is to provide a vehicle mirror with an image display function capable of displaying a brighter image.

The inventors have conducted various studies about the half mirror to achieve the object, and completed the invention.

That is, the invention provides the following [1] to [8].

[1] A vehicle mirror with an image display function comprising, in this order: an image display device; a circular polarization reflection layer; and a front surface plate made of glass or plastic, in which the circular polarization reflection layer includes a linear polarization reflection plate and a ¼ wavelength plate from the image display device side.

[2] The vehicle mirror with an image display function according to [1], in which the linear polarization reflection plate has a multi-layer structure.

[3] The vehicle mirror with an image display function according to [2], in which the multi-layer structure is a multi-layer structure in which resins having different types of birefringence are alternately laminated.

[4] The vehicle mirror with an image display function according to any one of [1] to [3], in which the linear polarization reflection plate and the ¼ wavelength plate are directly adhered to each other through an adhesive layer.

[5] The vehicle mirror with an image display function according to any one of [1] to [4], in which the ¼ wavelength plate is a stretched film.

[6] The vehicle mirror with an image display function according to [5], in which the ¼ wavelength plate is a polycarbonate film.

[7] The vehicle mirror with an image display function according to any one of [1] to [6], in which the image display device and the circular polarization reflection layer are directly adhered to each other through an adhesive layer.

[8] The vehicle mirror with an image display function according to any one of [1] to [7], which is a vehicle rearview mirror.

According to the invention, there is provided a novel vehicle mirror with an image display function. The vehicle mirror with an image display function of the invention is capable of displaying a brighter image. In addition, the vehicle mirror with an image display function of the invention is good in terms of the tint even when being used as a mirror. In addition, the vehicle mirror with an image display function of the invention has an advantage in that images and mirror-reflected images can be observed even through polarized sunglasses without direction dependency.

BRIEF DESCRIPTION OF THE DRAWINGS

The FIGURE shows an embodiment of the vehicle mirror according to the present invention.

DESCRIPTION OF THE PREFERRED EMBODIMENTS

Hereinafter, the invention will be described in detail.

In this specification, "to" is used to mean that numerical values before and after "to" are included as a lower limit value and an upper limit value.

In this specification, an angle such as "45°", "parallel", "vertical", or "perpendicular" means that a difference from an exact angle is in a range less than 5 degrees unless otherwise stated. The difference from an exact angle is preferably less than 4 degrees, and more preferably less than 3 degrees.

In electromagnetic rays, visible light rays are light rays in a wavelength region human's eyes can see, and refer to light in a wavelength region of 380 nm to 780 nm. Infrared rays (infrared light) are electromagnetic rays in a wavelength region which is longer than visible light rays and shorter than radio waves. In infrared rays, near-infrared light refers to electromagnetic rays in a wavelength region of 780 nm to 2500 nm.

In this specification, when "image" is used in regard to a mirror with an image display function, it means an image which can be observed by visually recognizing a half mirror from a front surface plate side when an image display portion of an image display device displays the image. In addition, in this specification, when "mirror-reflected image" is used in regard to the mirror with an image display function, it means an image which can be observed by being visually recognized from a front surface plate when the image display portion of the image display device displays no image.

<Vehicle Mirror with Image Display Function>

A vehicle mirror with an image display function can be used as, for example, a vehicle rearview mirror (inner mirror).

A vehicle mirror with an image display function of the invention includes an image display device, a circular polarization reflection layer, and a front surface plate in this order. Between the image display device and the circular polarization reflection layer, or between the circular polarization reflection layer and the front surface plate, other layers such as an adhesive layer may be included or not included. It is preferable that the circular polarization reflection layer and the front surface plate are directly adhered to each other. In addition, the image display device and the circular polarization reflection layer may be in direct contact with each other, an air layer may exist therebetween, or the image display device and the circular polarization reflection layer may be directly adhered to each other through an adhesive layer.

In this specification, a surface on the front surface plate side of the circular polarization reflection layer may be a front surface.

The image display device may be adhered to the circular polarization reflection layer in at least a part of the image display portion. The area of the surface of the circular polarization reflection layer to be adhered may be smaller than, the same as, or larger than that of the image display portion.

The front surface plate may be larger than, the same as, or smaller than the circular polarization reflection layer. The circular polarization reflection layer may be adhered to a part of the front surface plate, and another type of reflection layer such as metal foil may be adhered to or formed on the other portion of the front surface plate. In this configuration, it is possible to display an image on a part of the mirror. The circular polarization reflection layer may be adhered to the entire surface of the front surface plate, and the image display device having an image display portion with the same area as the circular polarization reflection layer may be adhered to the circular polarization reflection layer in the image display portion. In this configuration, it is possible to display an image on the entire surface of the mirror.

[Image Display Device]

The image display device is not particularly limited, but is preferably a liquid crystal display device. The image display device is preferably an image display device which emits (emits) linearly polarized light to form an image.

The liquid crystal display device may be a transmission type or a reflection type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, and the like.

The image which is displayed on the image display portion of the image display device may be a still image, a motion picture, or simple texture information. The display may be monochrome display such as black and white display, multi-color display, or full-color display.

[Circular Polarization Reflection Layer]

The circular polarization reflection layer functions as a semitransmissive-semireflective layer in the vehicle mirror with an image display function. That is, the circular polarization reflection layer functions to transmit the light emitted from the image display device during the image display such that the image is displayed on the front surface of the vehicle mirror with an image display function. During the non-image display, the circular polarization reflection layer functions to reflect light incident in a front surface plate direction such that the front surface of the vehicle mirror with an image display function serves as a mirror.

In the mirror with an image display function of the invention, since the circular polarization reflection layer is used, incidence rays from the front surface can be reflected as circularly polarized light, and incidence rays from the image display device can be transmitted as circularly polarized light. Accordingly, in the mirror with an image display function of the invention, it is possible to observe images and mirror-reflected images even through polarized sunglasses without depending on the relationship between the transmission axis direction of the polarized sunglasses and the horizontal direction of the mirror with an image display function.

The circular polarization reflection layer includes a linear polarization reflection plate and a ¼ wavelength plate. The circular polarization reflection layer may include other layers such as an alignment layer and an adhesive layer.

In the circular polarization reflection layer, the linear polarization reflection plate and the ¼ wavelength plate may be bonded such that an angle of a slow axis of the ¼ wavelength plate with respect to a polarization reflection axis of the linear polarization reflection plate is 45°. Examples of the bonding method include a method using an adhesive layer to be described later and a method including lamination between rolls using an adhesive film. It is preferable that the linear polarization reflection plate and the ¼ wavelength plate are directly adhered to each other through an adhesive layer. Using this circularly polarizing plate in which the linear polarization reflection plate is disposed so as to serve as a surface close to the image display device, the light for image display from the image display device can be efficiently converted into circularly polarized light and emitted from the front surface of the vehicle mirror with an image display function. When the light for image display from the image display device is linearly polarized light, the polarization reflection axis of the linear polarization reflection plate may be adjusted to transmit the linearly polarized light.

The film thickness of the circular polarization reflection layer is preferably in a range of 2.0 μm to 300 μm, and more preferably in a range of 8.0 to 200 μm.

(Linear Polarization Reflection Plate)

Examples of the linear polarization reflection plate include (i) a dielectric multi-layer film, (ii) a polarizer having a laminate of thin films having different types of birefringence, (iii) a wire grid-type polarizer, (iv) a polarization prism, and (v) a scattering anisotropic polarizing plate.

Examples of (i) the dielectric multi-layer film include a multi-layer film in which a plurality of layers of dielectric materials with different refractive indices are laminated on a support in an oblique direction through a vacuum deposition method or a sputtering method. In order to produce a wavelength selective reflection film having a linear polarization function, it is preferable that optical anisotropic dielectric thin films and optical isotropic dielectric thin films are alternately laminated. This is produced by, for example, alternately laminating a layer in an oblique direction and a layer in a vertical direction on a support. One type of material may be laminated, or two or more types of materials may be laminated. The number of layers laminated is preferably 10 layers to 500 layers, and more preferably 50 to 300 layers. Examples of the material to be laminated include $Ta_2O_5$, $TiO_2$, $SiO_2$, and $LaTiO_3$.

The method of forming a dielectric multi-layer film is not particularly limited, and can be appropriately selected in accordance with the purpose. Examples thereof include a vacuum deposition method using ion plating or ion beams, a physical vapor deposition method (PVD method) such as sputtering, and a chemical vapor deposition method (CVD method). Among these, a vacuum deposition method and a sputtering method are preferable, and a sputtering method is particularly preferable.

As (ii) the polarizer having a laminate of thin films having different types of birefringence, for example, a polarizer described in JP1997-506837A (JP-119-506837A) can be used.

Specifically, when processing is performed under conditions selected to obtain a refractive index relationship, it is possible to form a polarizer by using a wide variety of materials. In general, one of first materials needs to have a refractive index different from that of a second material in a selected direction. The difference in the refractive index can be achieved by various methods including stretching during or after film formation, extrusion molding, and coating. Moreover, in order to subject two materials to extrusion simultaneously, the materials preferably have similar rheological properties (for example, melt viscosity).

A commercially available product can be used as the polarizer having a laminate of thin films having different types of birefringence. Examples of the commercially available product include DBEF (product name) (registered trademark) and APF manufactured by 3M.

(iii) The wire grid-type polarizer is a polarizer which transmits one of linearly polarized light and reflects the other by birefringence of fine metal wires.

The wire grid polarizer has metal wires arranged periodically, and is used as a polarizer mainly in a terahertz wave band. In order to allow the wire grid to function as a polarizer, the wire interval is required to be sufficiently smaller than the wavelength of incident electromagnetic waves.

In the wire grid polarizer, metal wires are arranged at regular intervals. A polarization component in a polarization direction parallel to a longitudinal direction of the metal wire is reflected by the wire grid polarizer, and a polarization component in a polarization direction vertical thererto is transmitted through the wire grid polarizer.

A commercially available product can be used as the wire grid-type polarizer. Examples of the commercially available product include a wire grid polarization filter 50×50, NT46-636 manufactured by Edmund Optics Inc.

(¼ Wavelength Plate)

The ¼ wavelength plate is not particularly limited, and can be appropriately selected in accordance with the purpose. Examples thereof include a quartz plate, a stretched film such as a stretched polycarbonate film or a stretched norbornene-based polymer film, a transparent film containing aligned inorganic grains having birefringence such as strontium carbonate, and a thin film in which an inorganic dielectric material is obliquely vapor-deposited on a support.

Examples of the ¼ wavelength plate include (1) a retardation plate described in JP1993-27118A (JP-H5-27118A) and JP1993-27119A (JP-H5-27119A) in which a birefringent film having large retardation and a birefringent film having small retardation are laminated such that optical axes thereof are perpendicular to each other, (2) a retardation plate described in JP1998-68816A (JP-H10-68816A) in which a polymer film having a $\lambda/4$ wavelength at a specific wavelength and a polymer film made of the same material as the former polymer film and having a $\lambda/2$ wavelength at the same wavelength are laminated to obtain a $\lambda/4$ wavelength in a wide wavelength region, (3) a retardation plate described in JP1998-90521 (JP-H10-90521), capable of achieving a $\lambda/4$ wavelength in a wide wavelength region by laminating two polymer films, (4) a retardation film capable of achieving a $\lambda/4$ wavelength in a wide wavelength region by using a modified polycarbonate film described in WO00/26705A, and (5) a retardation plate capable of achieving a $\lambda/4$ wavelength in a wide wavelength region by using cellulose acetate film described in WO00/65384A.

A commercially available product can be also used as the ¼ wavelength plate. Examples of the commercially available product include PURE-ACE WR (product name) (manufactured by TEIJIN LIMITED).

The ¼ wavelength plate may be formed by arranging and fixing a polymerizable liquid crystal compound and a polymer liquid crystal compound. For example, the ¼ wavelength plate can be formed by coating a support, an alignment film, or a surface of the front surface plate with a liquid crystal composition, forming the polymerizable liquid crystal compound in the liquid crystal composition in a nematic alignment in a liquid crystal state, and then fixing the alignment by photo-crosslinking or thermal crosslinking. The ¼ wavelength plate may be a layer which is obtained by coating a support, an alignment film, or a surface of the front surface plate with a liquid crystal composition containing a polymer liquid crystal compound, forming the compound in a nematic alignment in a liquid crystal state, and then fixing the alignment by cooling.

Method of Producing ¼ Wavelength Plate Formed from Liquid Crystal Composition

The liquid crystal composition contains a polymerizable liquid crystal compound, and if necessary, may further contain a surfactant, a polymerization initiator, and the like. A liquid crystal composition which contains a solvent and the like added thereto if necessary is coated on a support, an alignment film, or the like, and after alignment and maturing, the liquid crystal composition is cured for fixing to form the ¼ wavelength plate.

(Polymerizable Liquid Crystal Compound)

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a high-molecular liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylene unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more types of polymerizable liquid crystal compounds may be used in combination. Using two or more types of polymerizable liquid crystal compounds may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

(Polymerization Initiator)

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of triarylimidazole dimer and p-aminophenylketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1 to 20 mass %, and more preferably 0.5 mass % to 5 mass % with respect to the content of the polymerizable liquid crystal compound.

(Crosslinking Agent)

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneimi-nocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyl-trimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 mass % to 20 mass %, and more preferably 5 mass % to 15 mass %. In a case where the content of the crosslinking agent is less than 3 mass %, the crosslinking density improving effect may not be obtained, and in a case where the content of the crosslinking agent is greater than 20 mass %, the stability may be reduced.

(Alignment Control Agent)

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0031] to [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

(Other Additives)

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

(Solvent)

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

(Coating, Alignment, Polymerization)

The method of coating a support, an alignment film, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. Furthermore, the coating can also be performed by transferring a liquid crystal composition, which has been separately applied onto a support. By heating the liquid crystal composition applied, the liquid crystal molecules are aligned. The liquid crystal molecules are preferably aligned in a nematic manner. The heating temperature is preferably 50° C. to 120° C., and more preferably 60° C. to 100° C.

The aligned liquid crystal compound can be further subjected to polymerization to cure the liquid crystal composition. The polymerization may be any one of thermal polymerization and photopolymerization by light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or higher than 70%, and more preferably equal to or higher than 80%. The rate of the polymerization reaction can be determined by measuring the consumption rate of polymerizable functional groups by using an infrared (IR) absorption spectrum.

The thickness of the ¼ wavelength plate formed from the liquid crystal composition is not particularly limited. The thickness is preferably in a range of 0.2 to 10 µm, and more preferably 0.5 to 2 µm.

(Support, Alignment Layer)

The liquid crystal composition may be coated on a surface of a support or an alignment layer formed on the surface of the support. The support may be a temporary support to be peeled off after the formation of the layer.

Examples of the support include polyester such as polyethylene terephthalate (PET), polycarbonate, an acrylic resin, an epoxy resin, polyurethane, polyamide, polyolefin, a cellulose derivative, silicone, and a glass plate.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, ω-tricosanoic acid, dioctadecylmethylammonium chloride, or methyl stearate) by a Langmuir-Blodgett method (LB film). Furthermore, an alignment layer may be used which obtains an alignment function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer several times with paper or cloth in a certain direction.

The liquid crystal composition may be coated on a surface of a support or a rubbed surface of a support without providing the alignment layer.

The thickness of the alignment layer is preferably 0.01 to 5 and more preferably 0.05 to 2 µm.

[Front Surface Plate]

The vehicle mirror with an image display function of the invention has a front surface plate.

The front surface plate is not particularly limited. A glass plate or a plastic plate used to produce a usual mirror can be used as the front surface plate. The front surface plate is preferably transparent in a visible light region and preferably has low birefringence. Here, transparent in a visible light region means that the light transmittance in the visible light region is 80% or greater, and preferably 85% or greater. The light transmittance which is used as a measure of transparency is obtained using the method described in JIS A5759. That is, the transmittance is measured at wavelengths of 380 nm to 780 nm using a spectrophotometer, and multiplied by a weight value coefficient obtained from a spectral distribution of the International Commission on Illumination (CIE) daylight D65 and a wavelength distribution and a wavelength interval of CIE spectral luminous efficiency for photopic vision to calculate a weighted average, and thus the visible light transmittance is obtained. Examples of the plastic film include polycarbonate, an acrylic resin, an epoxy resin, polyurethane, polyamide, polyolefin, a cellulose derivative, and silicone.

The film thickness of the front surface plate may be approximately 100 µm to 10 mm, preferably 200 µm to 5 mm, and more preferably 500 µm to 2 mm.

[Adhesive Layer]

The vehicle mirror with an image display function of the invention may include an adhesive layer for adhesion between the image display device and the circular polarization reflection layer, between the circular polarization reflection layer and the front surface plate, and between other respective layers. The adhesive layer may be formed from an adhesive.

Adhesives are classified into hot-melt types, thermosetting types, photocurable types, reaction-curable types, and pressure-sensitive types which do not require curing. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method. From the viewpoint of optical transparency and heat resistance, materials based on acrylate, urethane acrylate, epoxy acrylate, or the like are preferably used.

<Half Mirror>

A half mirror can be formed using a circular polarization reflection layer and a front surface plate. A half mirror may be produced by forming a ¼ wavelength plate on a front surface plate and by then adhering a linear polarization reflection plate to the ¼ wavelength plate, or by adhering a front surface plate, a ¼ wavelength plate, and a linear polarization reflection plate prepared separately to an adjacent layer in this order.

<Method of Producing Vehicle Mirror with Image Display Function>

The vehicle mirror with an image display function of the invention can be produced by, for example, positioning a half mirror including a circular polarization reflection layer and a front surface plate on an image display surface of an image display device. Then, if necessary, the image display device and the half mirror may be formed integrally with each other. The image display device and the half mirror may be formed integrally with each other through connection or adhesion at an outer frame or a hinge.

EXAMPLES

Hereinafter, the invention will be described in more detail with reference to examples. The scope of the invention is not limited to the following examples.

Example 1

As a linear polarization reflection plate, a plate which was produced, based on a method described in JP1997-506837A (JP-H9-506837A), by adjusting thicknesses of respective layers of 2,6-polyethylene naphthalate (PEN) and 70-naphthalate/30-terephthalate copolyester (coPEN) such that the polarization control wavelength region was 380 nm to 720 nm was used. As a ¼ wavelength plate, PURE-ACE manufactured by TEIJIN LIMITED was used. A linear polarization reflection plate, a ¼ wavelength plate, and a front surface plate (glass plate) were adhered in this order to an adjacent layer using a UV-curable adhesive Exp. U12034-6 manufactured by DIC CORPORATION to produce a half mirror of the example. At this time, the slow axis of the ¼ wavelength plate was inclined by 45 degrees with respect to the transmission axis of the linear polarization reflection plate (polarization direction of light emission of the LCD).

Comparative Example 1

A half mirror was produced in the same manner as in Example 1, except that the ¼ wavelength plate was not bonded.

Comparative Example 2

A reflection layer was formed by uniformly vapor-depositing Al (metal aluminum) on a glass plate through a vacuum deposition method, and then a silicon oxide (SiO) was vapor-deposited as an inorganic barrier layer to produce a half mirror with visible light reflectivity of 65%.

The half mirror was disposed such that the circular polarization reflection plate was superposed on an image display surface of a liquid crystal display device (LCD) (manufactured by Apple Inc., iPad Air) (emission peak wavelength, 450 nm (B), 540 nm (G), 630 nm (R)) and the front surface plate was on the opposite side (nearest to an observer). At this time, the transmission axis of the linear polarization reflection plate was in the same direction as the transmission axis of the LCD (polarization direction of light emission of the LCD).

<Evaluation>

(Brightness) The front luminance during white display of the liquid crystal display device was measured using a measuring machine (EZ-Contrast 160D manufactured by ELDIM) as in the description in a paragraph [0180] in JP2009-93166A. "(The front luminance after the installation of the half mirror/the front luminance before the installation of the half mirror)×100%" was obtained for evaluation based on the following standards.

A: 100% or less and greater than 50%
B: 50% or less and greater than 40%
C: 40% or less (Front Tint of Image, Possibility of Visual Recognition of Mirror-Reflected Image)

The visual evaluation was performed through polarized sunglasses.

Regarding the evaluation of the front tint of an image, an example in which color balance and the like did not considerably change in comparison with an image when viewed without the polarized sunglasses was evaluated to be "good", and a case where color balance and the like changed was evaluated to be "bad".

Regarding the possibility of the visual recognition of a mirror-reflected image, an example in which even in a case where the image display surface of the mirror with an image display function was rotated about a normal line thereof with respect to the polarized sunglasses, a mirror-reflected image could be always visually recognized was evaluated to be "possible", and an example in which there was a direction in which the mirror-reflected image could not be visually recognized was evaluated to be "not possible".

The image of the LCD observed through the half mirror of the example was brighter than the image of the LCD observed through the half mirror of Comparative Example 2 including the metal-deposited mirror. In addition, in a non-image display (power-off) mode of the LCD, the mirror-reflected image observed in the half mirror of the example could be visually recognized in any direction even through polarized sunglasses, but in a case of the half mirror of Comparative Example 1, there was a direction in which the mirror-reflected image could not be visually recognized.

TABLE 1

| | ¼ Wavelength Plate | Reflection Layer | LCD Brightness | Sunglasses Evaluation | |
|---|---|---|---|---|---|
| | | | | Front Tint of Image | Possibility of Visual Recognition of Mirror-Reflected Image |
| Example 1 | Used | Linear Polarization Reflection Plate | A (85%) | Good | Possible |
| Comparative Example 1 | None | Linear Polarization Reflection Plate | A (85%) | Good | Not Possible |
| Comparative Example 2 | None | Metal-Deposited Film | C (38%) | Good | Possible |

What is claimed is:

1. A vehicle mirror with an image display function comprising, in this order:
    an image display device;
    a circular polarization reflection layer; and
    a front surface plate, made of glass or plastic, on an outermost surface of the vehicle mirror,
    wherein:
    the circular polarization reflection layer and the front surface plate are directly adhered to each other;
    the circular polarization reflection layer includes a linear polarization reflection plate and a ¼ wavelength plate,
    the image display device, the linear polarization reflection plate, and the ¼ wavelength plate are arranged in this order; and
    the linear polarization reflection plate and the ¼ wavelength plate are directly adhered to each other through an adhesive layer.

2. The vehicle mirror with an image display function according to claim 1,
    wherein the linear polarization reflection plate has a multi-layer structure.

3. The vehicle mirror with an image display function according to claim 2,
    wherein the multi-layer structure is a multi-layer structure in which resins having different types of birefringence are alternately laminated.

4. The vehicle mirror with an image display function according to claim 2,
    wherein the ¼ wavelength plate is a stretched film.

5. The vehicle mirror with an image display function according to claim 4,
    wherein the ¼ wavelength plate is a polycarbonate film.

6. The vehicle mirror with an image display function according to claim 5,
    wherein the front surface plate is made of glass.

7. The vehicle mirror with an image display function according to claim 5, which is a vehicle rearview mirror.

8. The vehicle mirror with an image display function according to claim 7, which has an outer frame.

9. The vehicle mirror with an image display function according to claim 1,
    wherein the ¼ wavelength plate is a stretched film.

10. The vehicle mirror with an image display function according to claim 9,
    wherein the ¼ wavelength plate is a polycarbonate film.

11. The vehicle mirror with an image display function according to claim 10, wherein the front surface plate is made of glass.

12. The vehicle mirror with an image display function according to claim 10, which is a vehicle rearview mirror.

13. The vehicle mirror with an image display function according to claim 12, which has an outer frame.

14. The vehicle mirror with an image display function according to claim 1,
   wherein the image display device and the circular polarization reflection layer are directly adhered to each other through an adhesive layer.

15. The vehicle mirror with an image display function according to claim 1,
   wherein the front surface plate is made of glass.

16. The vehicle mirror with an image display function according to claim 1, which is a vehicle rearview mirror.

17. The vehicle mirror with an image display function according to claim 16, which has an outer frame.

18. The vehicle mirror with an image display function according to claim 1, which has an outer frame.

* * * * *